(12) United States Patent
Black et al.

(10) Patent No.: US 6,288,387 B1
(45) Date of Patent: Sep. 11, 2001

(54) APPARATUS AND METHOD FOR PERFORMING OPTICAL SIGNAL INTENSITY CORRECTION IN ELECTRO-OPTICAL SENSOR ARRAYS

(75) Inventors: Stephen H. Black, Buellton; James T. Woolaway, II, Goleta, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/296,044

(22) Filed: Apr. 21, 1999

(51) Int. Cl.[7] .......................... G02B 21/00; H01J 40/14; H04N 5/335
(52) U.S. Cl. ............... 250/214 A; 250/214 AG; 250/208.1; 348/241; 348/300
(58) Field of Search ..................... 250/252.1, 332, 250/334, 214 A, 214 AG, 208.2, 208.1; 348/241, 300–302, 308

(56) References Cited

U.S. PATENT DOCUMENTS

| | | | |
|---|---|---|---|
| 5,841,126 | * 11/1998 | Fossum et al. | 250/208.1 |
| 5,905,530 | * 5/1999 | Yokota et al. | 348/241 |
| 6,064,431 | * 5/2000 | Ueno | 341/241 |

* cited by examiner

*Primary Examiner*—F. L. Evans
*Assistant Examiner*—Zandra V. Smith
(74) *Attorney, Agent, or Firm*—William C. Schubert; Glenn H. Lenzen, Jr.

(57) ABSTRACT

A method and related system provides an array of sensing elements located in rows and columns, and each column of sensing elements has a connected circuit chain which processes the signals from the sensing elements in that column. Each circuit chain produces a signal with a corrective gain value calculated for it relative to the datum of the array which is selected for the point where signal strength would be strongest. The method and device is capable of being used in a starring or scanning type array mode.

18 Claims, 20 Drawing Sheets

APPARATUS AND METHOD FOR PERFORMING OPTICAL SIGNAL INTENSITY CORRECTION IN ELECTRO-OPTICAL SENSOR ARRAYS

BACKGROUND OF THE INVENTION

The present invention relates to infrared detection methods, and relates more particularly to improvements in such detection methods whereby the method and circuitry to perform the corrective signal processing to compensate for known or intrinsic optical signal intensity errors to the image plane of systems using electronics electro-optics sensors is provided to detect a thermal signature which would otherwise be less detectable.

In modern electro-optical sensor systems, solid-state electronic devices are used to perform the function of sensing incident radiation at the image plane of the system, integrating this signal, and multiplexing it for processing by systems electronics. Examples of the solid-state electronic devices are the charge coupled device (CCD) used in video cameras and infrared focal plane arrays that are used in many civilian and military systems. For these arrays two principal component materials are used to realize their fabrication. These are the incident radiation sensing detector material and the readout integrated circuit. The detector materials is chosen and optimized for sensing specific incident radiation wavelengths, and the readout is selected for its properties in realizing the desired signal processing to multiplexing functions.

Novel signal processing circuitry is described that allows correction of optical system non-uniformities to be performed on focal plane array. In effort to reduce the size and weight of modern infrared focal plane array systems, slower f-number optical systems with shorter cold shields are often used. In these systems, the signal and background intensity levels at the image focal plane decrease with increasing distance from the optical center axis. This results in a situation where some of the signal dynamic range is lost due to the off-axis optical effects. The incorporation of on-focal plane array signal processing electronics that correct for these off axis optical effects allows the full dynamic range of the sensor to be achieved, thus allowing a lower-cost and higher performance system to be realized.

In previous scanning and staring focal plane arrays the response to incident radiation (signal chain transimpedance) have been designed such that it is the same for each detector channel. In these systems and in an ideal sense, an incident signal that is non-uniform will produce an output signal from the sensor that has the same non-uniform characteristic. It is possible, however, to calculate based on the design of the optical system, the optical signal intensity errors that will be present. In the case of many infrared systems the signal intensity that reaches the focal plane array decreases on the focal plane with distance from the optical center axis. This effect typically results in a decrease in signal level of 20 percent or more from a signal at the optical center axis. This signal loss therefore accounts for more than 20 percent of the available dynamic range for the sensor output. The off-axis signal intensity error increases with slow optics, shorter cold shields, and larger focal plane arrays. The signal loss places additional systems requirements on the analog to digital converter and subsequent signal processing electronics.

Since the intrinsic behavior of these optical systems is known, it is possible to design into the focal plane array a corrective gain that is spatially correlated to the errors introduced from the optical system. This invention describes the methods and circuitry for performing this corrective gain processing for scanning and staring infrared focal plan arrays. Two specific circuit areas are described for this corrective processing. These are the areas of the transimpedance amplifier and the background signal charge skimmer.

There is prior art developed in the areas of the optical systems, electro-optics sensors, in the circuitry associated with these devices, but the specific circuitry developed and employed as presented in this application is deemed unobvious and novel. However, it should be noted that similar circuitry and methods within the scope of this invention could be used to realize the corrective signal processing for a wide range of electro-optical sensors and systems.

One object of the invention is to provide on-focal plane signal processing electronics for the correction of optically introduced non-uniformities applicable to infrared, visible and other electro-optical sensors in a wide range of applications and markets.

Another object of the invention is to allow the use of lower-cost, smaller and lower weight optical systems which are more likely to generate optical signal errors to focal plane.

A further object of the invention is to provide such optical systems which are benefit from the incorporation of such on-focal plane signal processing electronics.

SUMMARY OF THE INVENTION

The invention resides in a device for enhancing signal detection comprising a sensory array of sensing elements extending in columns and in rows in first and second orthogonally disposed directions, respectively and a datum selected on the array for reference relative to the columns and rows (x, y). A plurality of circuit chains is provided and each is associated with a given column of the sensing elements for processing a signal into recognizable form. Each of the circuit chains taken relative to the datum has a means for producing a gain different from that of a circuit chain associated with a column of the sensing means located coincidentally with the datum.

Ideally, the array is defined by a planar image surface made up of the plurality of the sensing elements and the datum is a point on the array coincident with an optical central axis. Each of the circuits associated with a column of the sensing elements has a circuit portion defined by a capacitive transimpedance amplifier and skimmer circuit portion. The capacitive transimpedance amplifier portion of each of the circuit chains associated with a given column of the sensing elements has a capacitance which differs from the circuit chain associated with the column of sensing elements located coincidentally with the datum. The skimmer circuit portion of the circuit chain associated with the ones of the columns of sensing elements other than that located coincidentally with the datum has a capacitance which differs from the capacitance of the skimmer circuit portion of a circuit chain associated with the circuit chain associated with the sensing elements coincident with the datum.

Preferably, each column of the sensing elements extends in the first given direction (columns) and each of the circuit chains associated with the column of sensing elements is connected to one another to effect communication therebetween in the second orthogonally disposed direction (rows). Each of the circuit chains is multiplexed to effect function in the second given orthogonally disposed direction. Also, the array of the sensing elements is row addressed and column addressed by a plurality of multiplexers.

The invention further resides in a method of enhancing a signal comprising the steps of providing a sensory array comprised of a plurality of sensory elements arranged in rows and columns; selecting a datum on the array and referencing the rows and columns of the sensing elements relative to the datum; determining a prescribed gain for signals generated from a given column of the sensing element taken relative to the strength of a signal from sensory elements at the datum; and processing signals generated by a given column of the sensing elements in a dedicated circuit chain having an preassigned gain value capable of compensating for signal strength which is less than that of a signal detected at the datum.

The method ideally is further characterized by interconnecting circuit chains in each column of sensing elements with one another and by configuring each circuit chain associated with a given column of sensing element to an established prescribed gain by altering the capacitance of that circuit chain relative to the capacitance of the circuit chain associated with the column of sensing elements located coincidentally at the datum. Ideally, sampling is made of the signals produced in a given column of sensing element to establish a prescribed gain.

DETAILED DESCRIPTION OF THE PREFERRED EMBODIMENT

Figure 1:
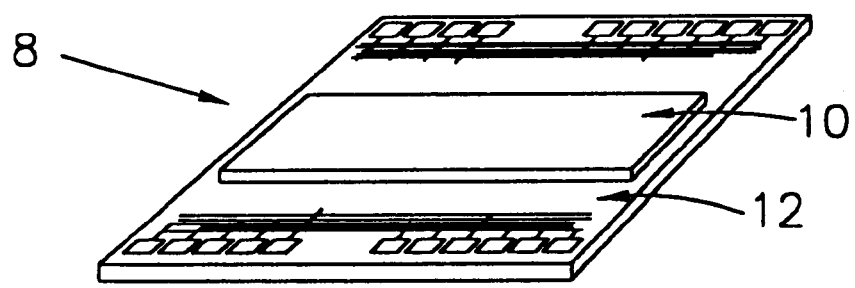
FIG. 1 is an illustration of a scanning infrared focal plane array.
Figure 2:
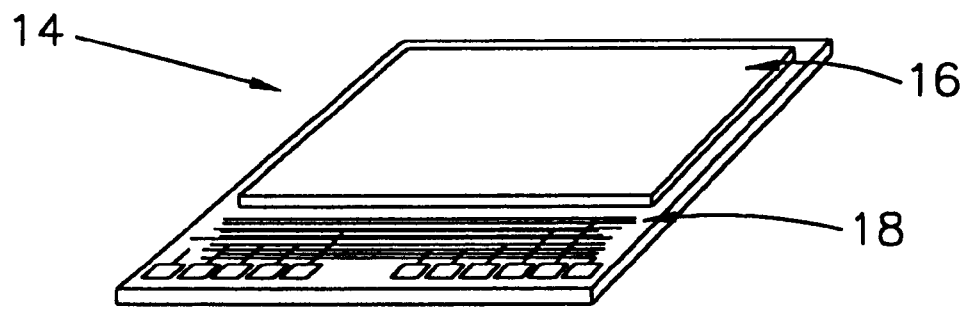
FIG. 2 is an illustration of staring infrared focal plane array.

FIG. 1 illustrates a scanning infrared focal plane array 8. Two principal components, make up the array, namely an infrared detector material 10 and a scanning readout multiplexer 12. Incident radiation to the different detector material generates a response in the detector, which is sensed, integrated, signal processed and multiplexed by the scanning readout multiplexer. Detector materials for the detector may be InSb, HCT or others. Silicon based technology is generally used to support the design and fabrication of the readout multiplexer. In the case of the scanning multiplexer, the image to be sensed is scanned across the surface of the device and a line or series of lines is sensed at any given time. FIG. 2 illustrates a staring infrared focal plane array 14. As in the case of the scanning sensor, an infrared detector material 16 is provided and is mated to the staring readout multiplexer 18. This array differs from scanning format in that all of the lines of the image can be sensed at one time. Thus it is not necessary for the image to be scanned on this array.

It should be understood that there are two classes of infrared focal plane arrays that can be considered for incorporation of corrective signal processing electronics for optical effects. These classes are the un-cooled and cooled sensors. In infrared systems, the detector material is sensing infrared radiation. It is the objective of these systems to have the scene dominate the infrared radiation content at the image plane of the infrared focal plane array. However, since warm objects radiate infrared energy, some of the energy reaching the infrared detector will have its origin in the optics and surrounding infrared sensor system. For the system classes of un-cooled and cooled sensors, there are potential differences in the nature and magnitude of the system generated parasitic infrared signals. Although these differences exist it is possible for either system type to calculate and correct for errors in the optical signal levels.

Figure 3:
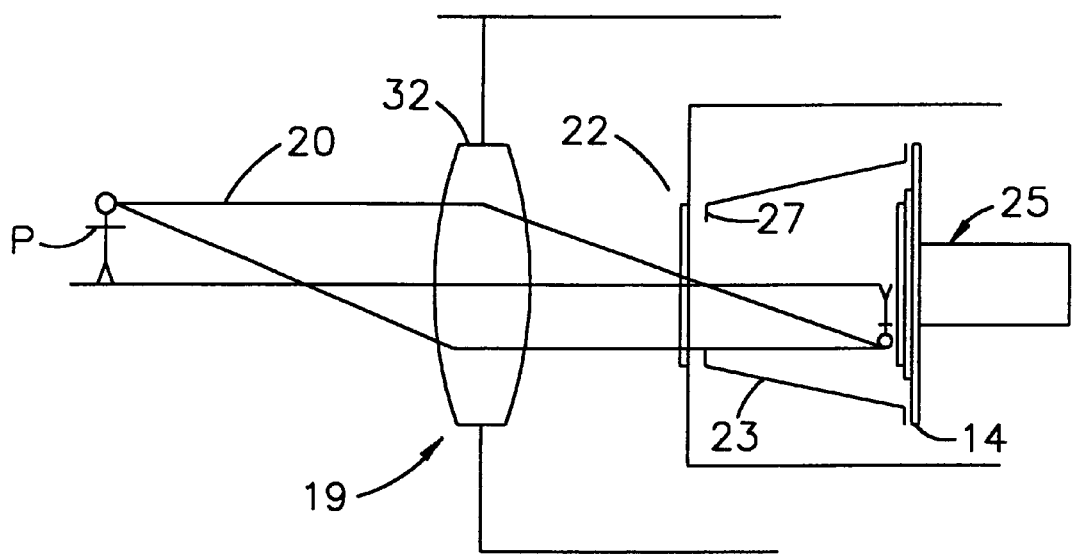
FIG. 3 is an illustration of simplified infrared system using a cooled focal plane array.
Figure 4:
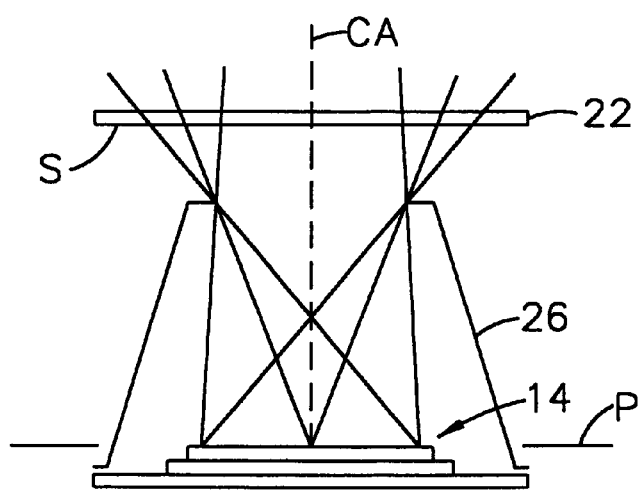
FIG. 4 illustrates a typical cooled focal plane array optical signal path.

FIG. 3 illustrates a simplified view of the scene, infrared optical system 19, and infrared sensor system. In this illustration a person P is shown as the infrared object in the scene. Radiation from this person is shown by the ray trace 20 through the simplified infrared optical system 19 to the infrared sensor 14. This illustration shows a cooled staring infrared focal plane array 14 mounted to the cold finger 25 of a cryogenic system. A cold shield 26 is illustrated in the system to shield radiation reaching the infrared sensor or focal plane from the warm surrounding environment. It should be noted here that the cold shield 26 and infrared focal plane array are both thermally connected to the cold finger and are cooled to a temperature significantly below room temperature. The ray trace of the infrared object is shown to pass through the optical system 19, the warm window 22, and through the aperture 27 of the cold shield before reaching the image plane of the infrared sensor. The infrared optical system 19 serves the purpose of collecting radiation from the infrared scene and focusing this energy to the image plane. The warm window 22 in conjunction with its supporting shroud 23 provides a vacuum wall allowing thermal isolation for the cold shield, infrared sensor and cold finger. FIG. 4 provides a cross-sectional detail view of the cold infrared sensor 14, cold shield 26, and the warm window components 22 described in FIG. 3. Optical ray traces are shown for the optical center axis and for the edges of the different sensor through the cold shield. The vacuum wall and window 22, 23 are warm and radiates infrared optical signal from the surface S which is received at the image plane P of the infrared sensor. It can be seen from FIG. 4 that the oblique angle to the cold shield aperture acts to decrease the apparent aperture size with increasing distance from the optical center axis CA. For the purposes of illustrating the effects of the warm window radiation on the incident radiation levels at the image plane, it is useful to consider that a gray body radiator can approximate the warm window emission properties. The radiation intensity from the warm window at the image plane would be the brightest at the center axis CA of the optical system. As one moves off the optical center axis CA in the plane of the focal plane array, the intensity from the warm window would decrease. As an illustrative analogy, it is useful to consider a large dark room with a single light on the ceiling of the room and in its center, the image plane being the floor of the room. The radiation to the image plane, or floor of the room would be brightest directly below the light. As one moves off axis from that centerline of the light to floor the intensity level on the floor from the light would decrease. This effect is due to two phenomena. First, the distance from the light to the floor increases as we move off axis. Second, the oblique angle to the aperture of the light increases thereby making the apparent aperture size decrease. To illustrate this consider the room to be extremely large and as we move to the corner of the room it will appear as though one is looking at the light side on.

Figure 5:
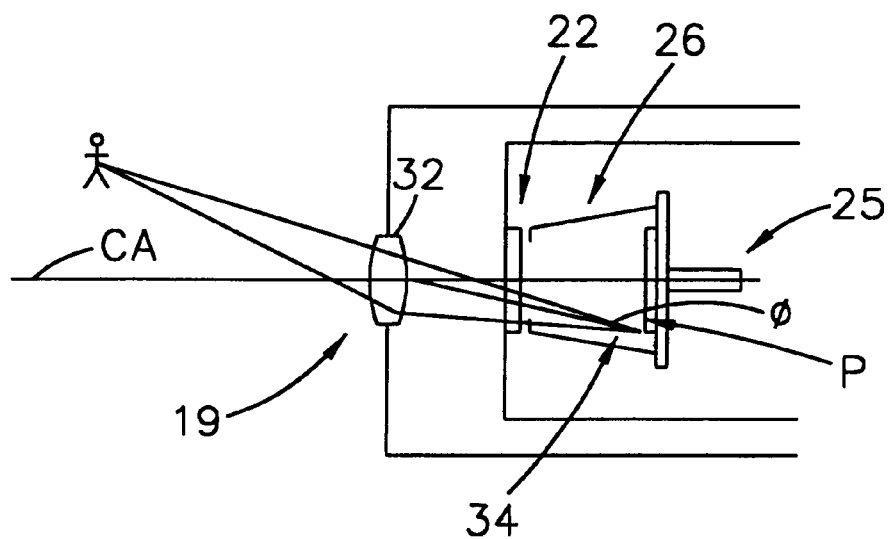
FIG. 5 is an illustration of off-axis object angle to optics system aperture.
Figure 6:
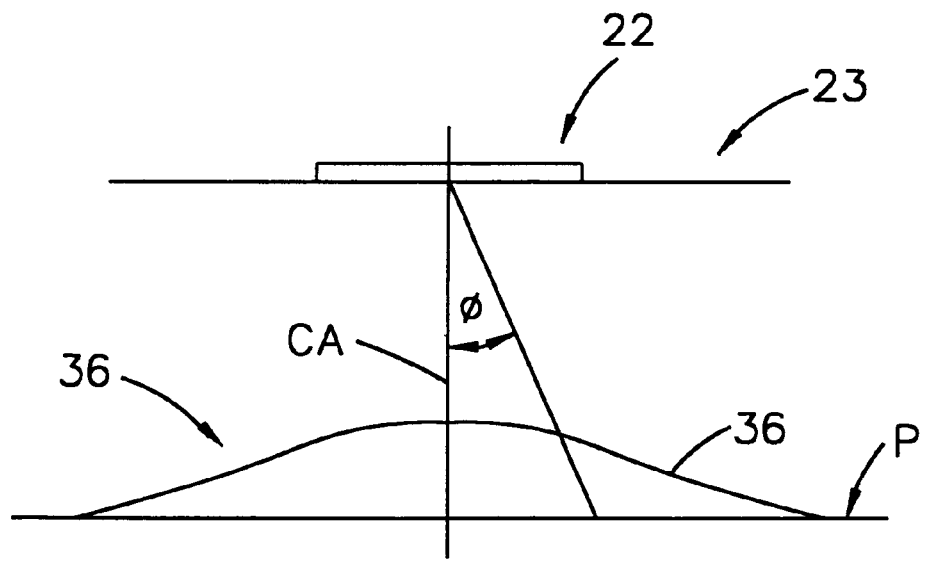
FIG. 6 is an illustration of relative intensity of incident radiation as a function of off-axis angle.

As seen in FIG. 5, a similar effect occurs in the optical system as well. For objects in the infrared scene that are off axis, the oblique angle to the aperture 32 of the infrared optical system also increases thereby decreasing the apparent infrared optical system aperture. As such, the collected energy from the infrared scene object decreases as the object moves off axis to the optical system. The net result of both the warm window and an off axis scene object 34 is illustrated in FIG. 6. The intensity of infrared radiation (line 36) from the warm window or off axis scene objects in shown as a line just above the image plane. It can be seen that the intensity is brightest at the optical center axis and decreases off axes. The oblique angle from a location in the image plane to the optical centerline is illustrated with the angle phi. The relative intensity of the off axis radiation at the image plan can be calculated as $\cos^4{th}$ (phi).

Figure 7:
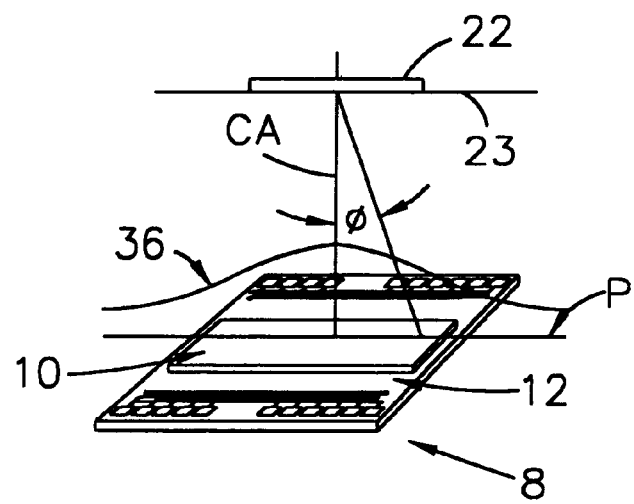
FIG. 7 is an illustration of the relative intensity of incident radiation effect to scanning sensor.
Figure 8:
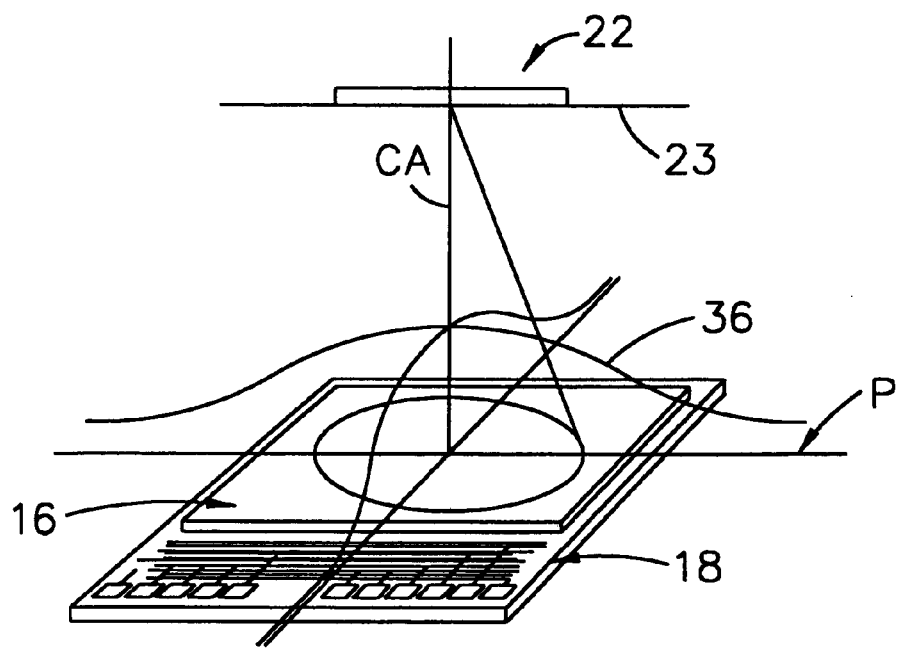
FIG. 8 is an illustration of the relative intensity of incident radiation effect to staring sensor.

FIG. 7 illustrates the effects of the off axis optical signal errors to the image plane of a scanning infrared sensor 8. Here the cold shield 26 and warm window 22 are shown above the scanning sensor. Here, the intensity as a function of phi is illustrated above the image plane of the scanning infrared sensor. Similarly, FIG. 8 illustrates the off axis optical signal errors for the staring infrared sensor array 14. Again the optical signal intensity is shown as a function of phi and is illustrated above the plane of the staring infrared sensor 14. In the case of the scanning sensor 8, FIG. 7, the principal effect is in the cross-scan direction or in the same direction as the columns of detectors. For the staring array to be optically effective, it must include two dimensions (columns and rows), as the array has active detector elements of axes in both x and y.

Figure 9:
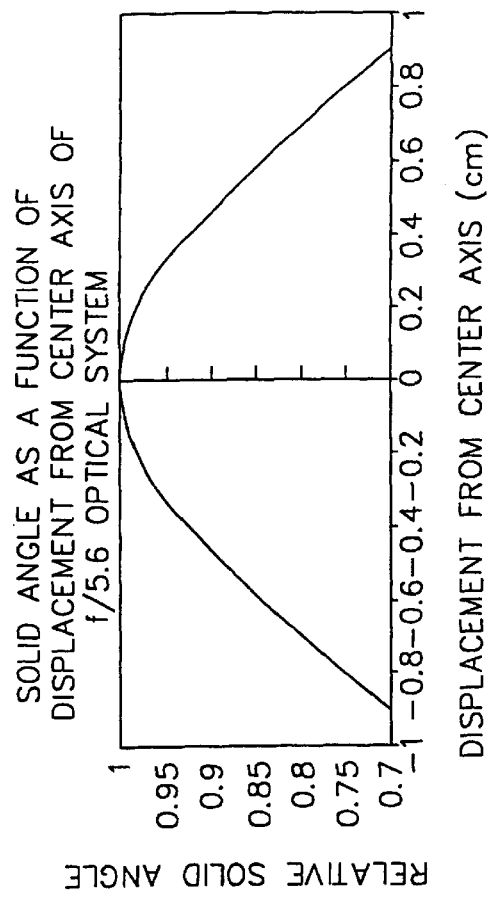
FIG. 9 is an illustration of relative intensity of incident radiation as a function of distance from center axis.

FIG. 9 illustrates the relative intensity or solid angle of incident radiation as a function from the optical center axis for a particular f/5.6 optical system with the cold shield located 0.85" above the focal plane array. The displacement from the center axis is shown in centimeters. For a 640-element sensor with 20-micron pixels it can be seen that a signal loss of approximately 20 percent would occur from the center axis detectors to the detectors at the edge of the array. The optical effects described here are common to slow f-number optical systems where the cold shield is relatively close to the focal plane array. It should be understood however that the techniques described here to correct for optical signal intensity errors could be applied to correct for any known or calculated intensity error effect.

Figure 10:
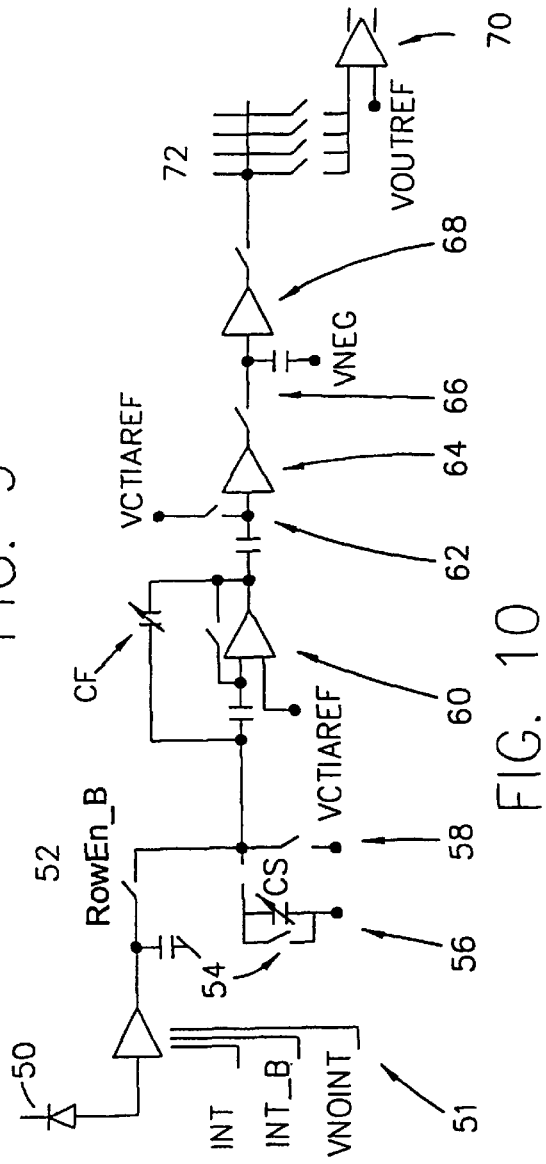
FIG. 10 is a block diagram of circuit components comprising signal chain for FPA with optical signal intensity correction circuitry.

Referring now to FIGS. 10 through 23 and to the circuitry that comprises the signal processing chain for performing the corrective signal processing for optical intensity error correction, it should be seen that FIG. 10 illustrates the block diagram for a single channel of the circuitry. The incident radiation sensing detector 50 element is shown to the left in this figure as a p-on-n element. Signal from the detector 50 is initially integrated into unit cell 51. This signal can then be sampled by the RowEn_B switch 52 to a column-based signal processing chain means. This means comprises a number of different circuit functions, namely a skimmer 56, Auto Zero 58, capacitive transimpedance amplifier (CTIA) 60, a clamp 62, a clamp buffer 64, a sample and hold 66, Mux buffer 68, and output amplifier 70. Selectively controllably connected to the input of the amplifier 70 is a column multiplexer 72. The sampling process for the unit cell is performed by enabling the ROW_B switch 52, which connects the unit cells integration capacitor to the sensing node of the CTIA 60. The configuration for the CTIA is preferably shown to be that of an auto zero CTIA. The charge sensing node or input of the CTIA is connected to the charge skimming circuit. Signal output from the CTIA is in turn clamped, buffered, sample and held, and multiplexed to the output amplifier.

Figure 11:
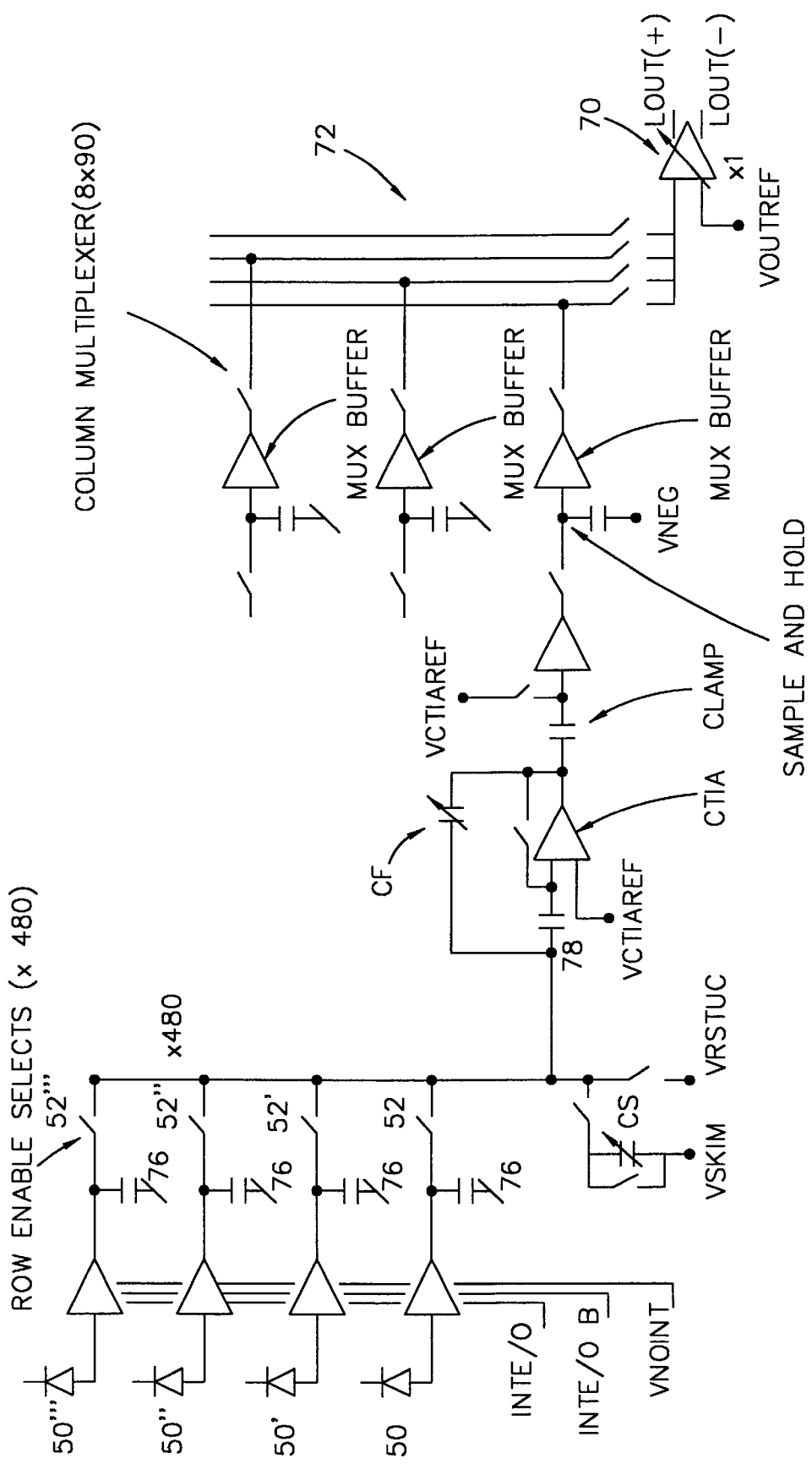
FIG. 11 is a block diagram of optical signal intensity correction circuit showing multiplexing configuration.
Figure 12:
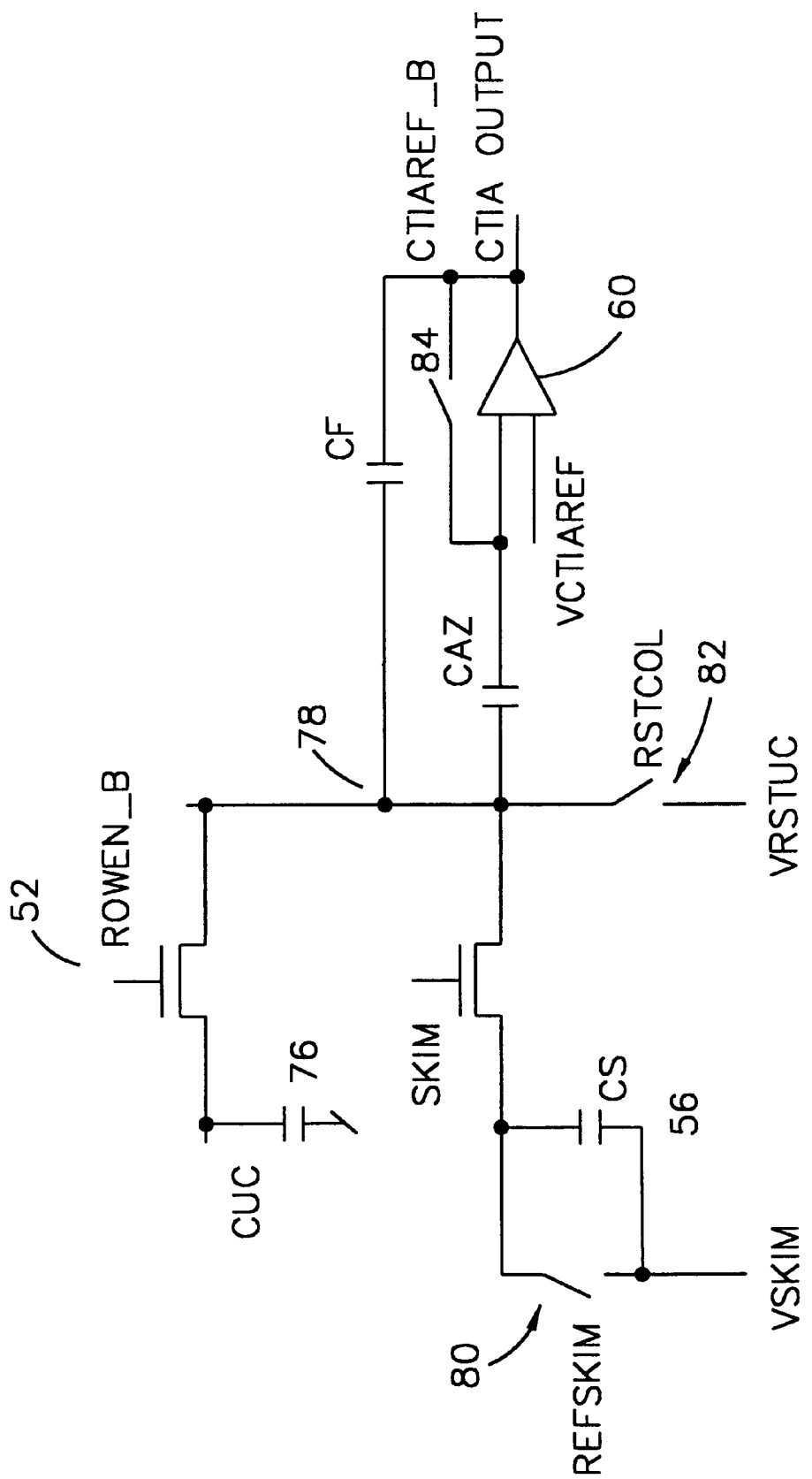
FIG. 12 is a block diagram of skimming and charge integration circuit for processing unit cell charge.

FIG. 11 illustrates the signal chain from FIG. 10 with the addition of detail of the core multiplexing circuitry 72. The configuration shown is for a 640×480 sensor array. Row enable select switches 52, 52', 52", 52''', show 4 of 480 instances per column based on a signal chain. In the illustrated embodiment, 640 column signal chains are shown to be multiplexed into a single output amplifier. The skimmer 56 and the auto zero CTIA 60 incorporate the optical intensity correction signal processing function. As illustrated in FIG. 12, a signal detected by the unit cell detector 50 is integrated in the unit cell on capacitor Cuc 76. The charge from the capacitor 76 can then be sensed by enabling the capacitor Cuc 76 to be connected to the Auto zero CTIA sensing amplifier input 78. This is performed by using the RowEn_B switch(s) 52. In order to prepare the amplifier(s) 60 to receive the signal from the unit cell capacitor 76, the amplifier 60 and the skimmer circuit 56 must be reset. The process of resetting the skimmer is performed by closing the switch RstSkim 80 at a time when skim is in its open state.

The amplifier is reset by closing switch RstCol 82 and CtiaRst_B 84 then opening switches 82 and 84 (RstCol and CtiaRst_B) in sequence. At this time, closing RowEn_B switch(es) 52 will cause the charge responsible for the potential difference between the integrated potential at capacitor 76 and the potential of Vrstuc to be integrated cross the auto zero CTIA feedback capacitor Cf. Closing switch Skim at the same time as closing RowEn_B allows a charge subtraction process to be performed between the unit cell capacitor Cuc 76 and the skimmer capacitor Cs. This process enables the suppression of background signal prior to the integration of this signal in the auto zero CTIA 60.

It should be known to those skilled in the art that the size of the auto zero CTIA feedback capacitor Cf determines the transimpedance of the signal chain from each unit cell integration capacitor to the output of the CTIA. Similarly, the size of the skimming stage capacitor Cs and the voltage that this capacitor reset to will determine the amount of charge to be subtracted.

Figure 13:
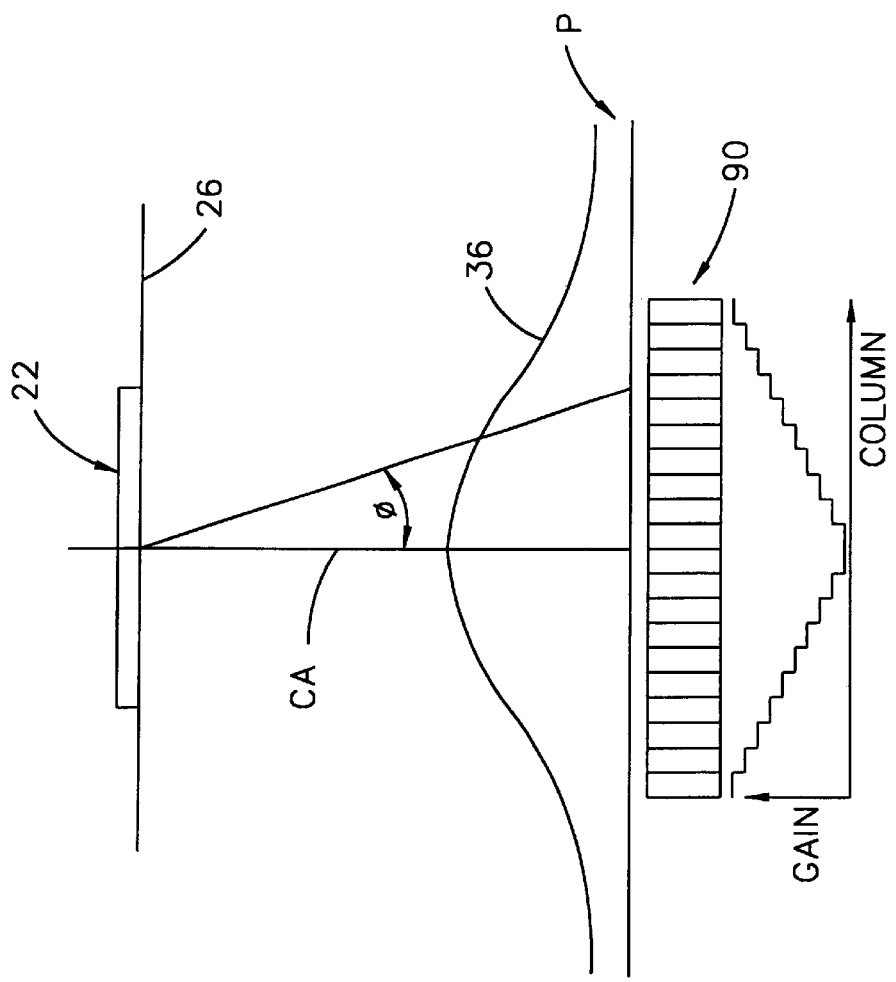
FIG. 13 is an illustration of optical signal intensity error and corrective gain for each detector column.

It should be further understood that the term "gain" has been used in this disclosure at times to describe the relative magnitude of the signal response from the unit cell through the signal chain. This process is typically converting charge to voltage and can also be referred to as transimpedance. FIG. 13 illustrates the effect of the optical signal intensity error as a function of column location on the infrared focal plane array. The cold shield 26 and warm window 22 are shown above the image plane P. The signal intensity level from the warm window's radiation and optical system is illustrated above the image plane showing a maximum signal level at the center of the optical axis CA. The off axis signal level is shown to decrease, below the image plane P relative to the number of detector columns 90 illustrated. The average signal intensity across each detector column location gives rise to a quantized signal error based on column location. The corrective gain for each column is shown below each detector column. By increasing the gain of the column amplifiers with increasing distance for the optical center axis, it is possible to correct for the spatial optical signal intensity loss. Quantized corrective gains are shown for each column.

Figure 14:
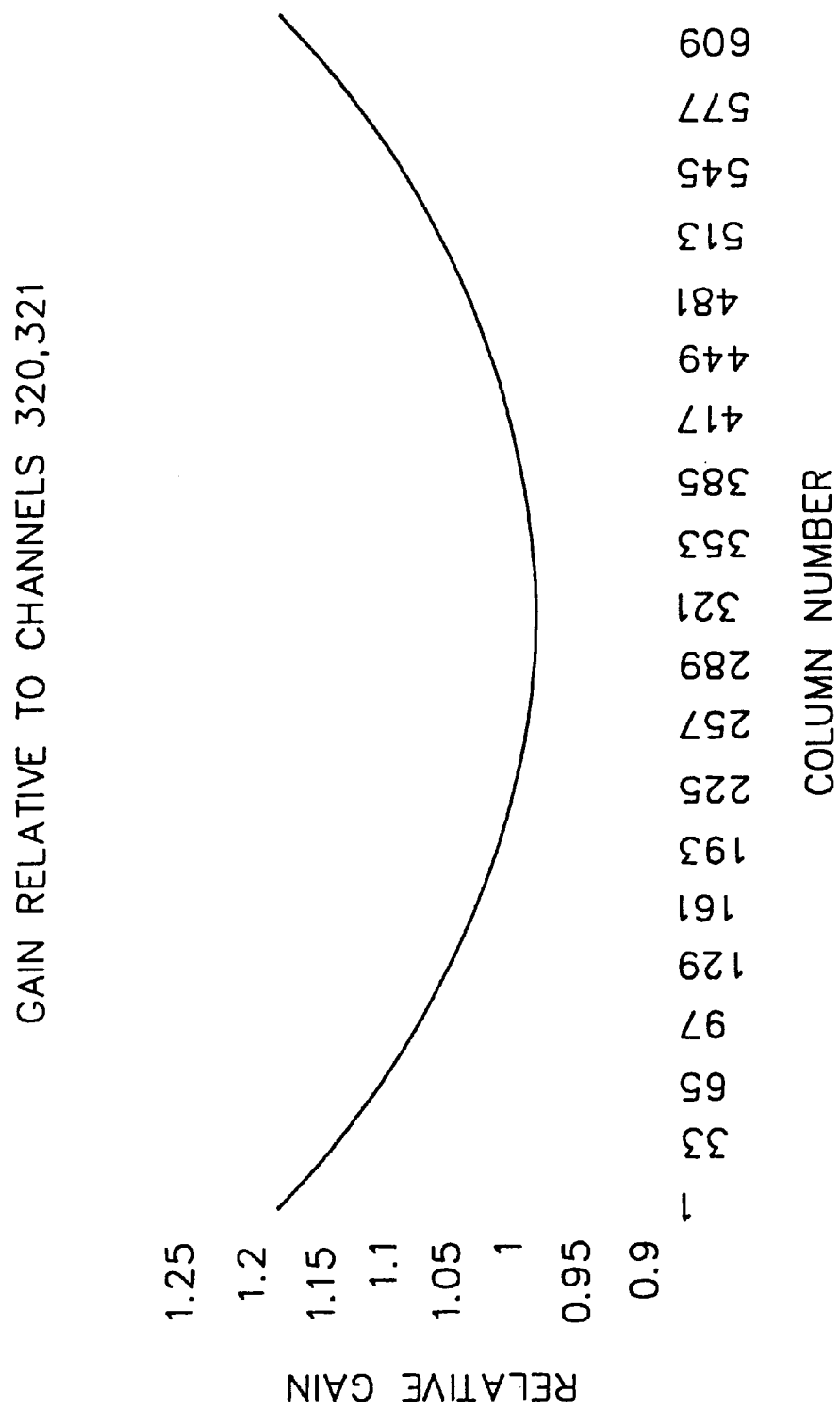
FIG. 14 is a graphical representation of data showing calculations for corrective gains for 640 channel FPA for a f/5.6 optical system.

FIG. 14 illustrates the calculated gain for each 640 detector columns 90 for a f/5.6 optical system with cold shield located 0.85" above the focal plane array. It is shown here that an error of about 20% in the optical signal intensity is seen between the optical center axis (column 320) and the columns at the edge of the sensor (column 1, 640).

Figure 15:
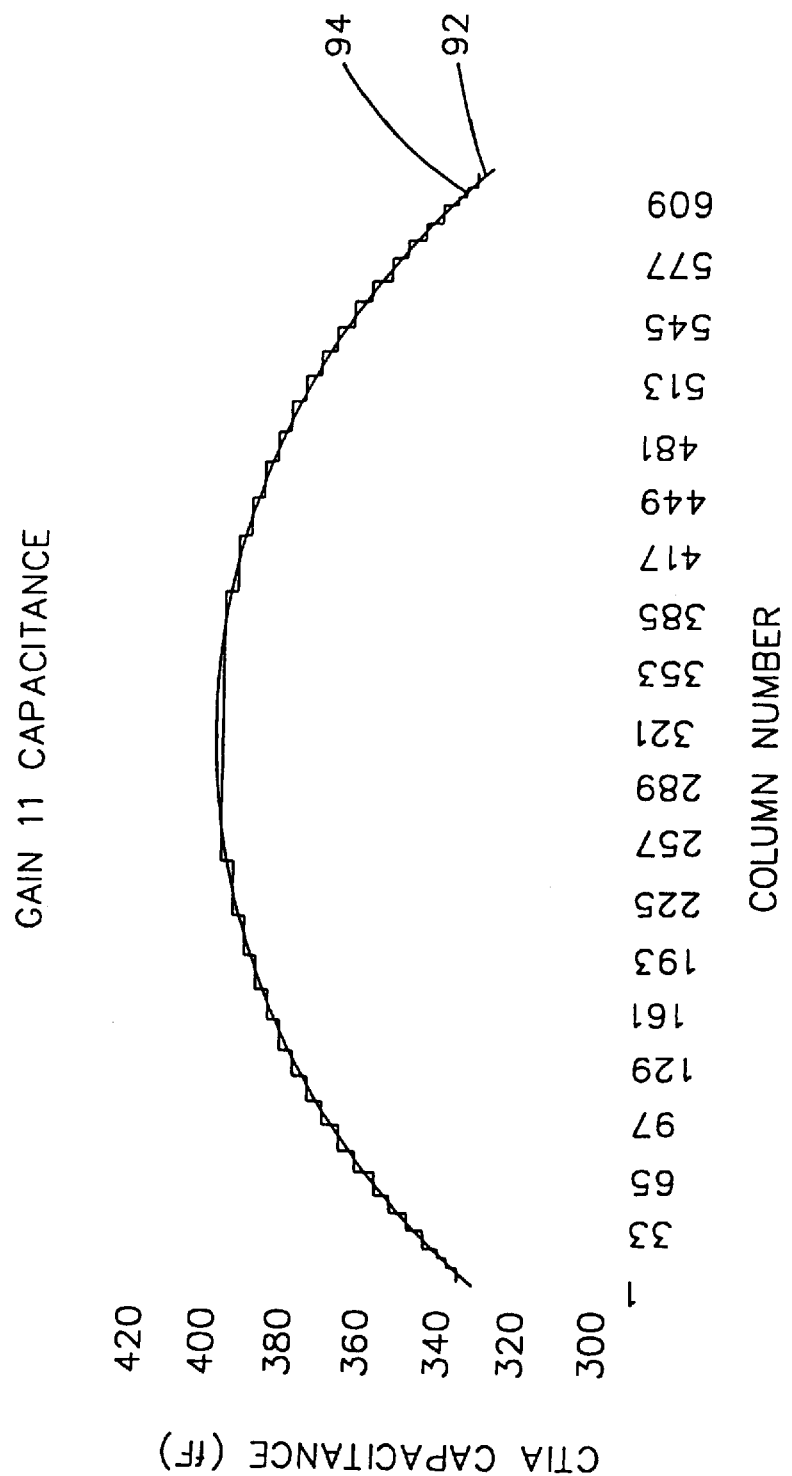
FIG. 15 is an illustration of ideal and realized gain capacitors for the skimming and integration stages (by column).

FIG. 15 shows two curves superimposed on one another. The first of these curves 92, the smooth curve, is the calculated capacitance for the auto zero CTIA capacitor Cf to achieve the relative gain as illustrated in FIG. 14. The second of the superimposed curves 94, the stair stepped curve, shows the realizable values for the auto zero CTIA capacitor Cf. Due to the limited number of database points allowed in the database for the integrated circuit database, the capacitor Cf can only be implemented in quantized increments. The stair steps shown in curve 94 in the value of Cf reflect these increments.

Figure 16:
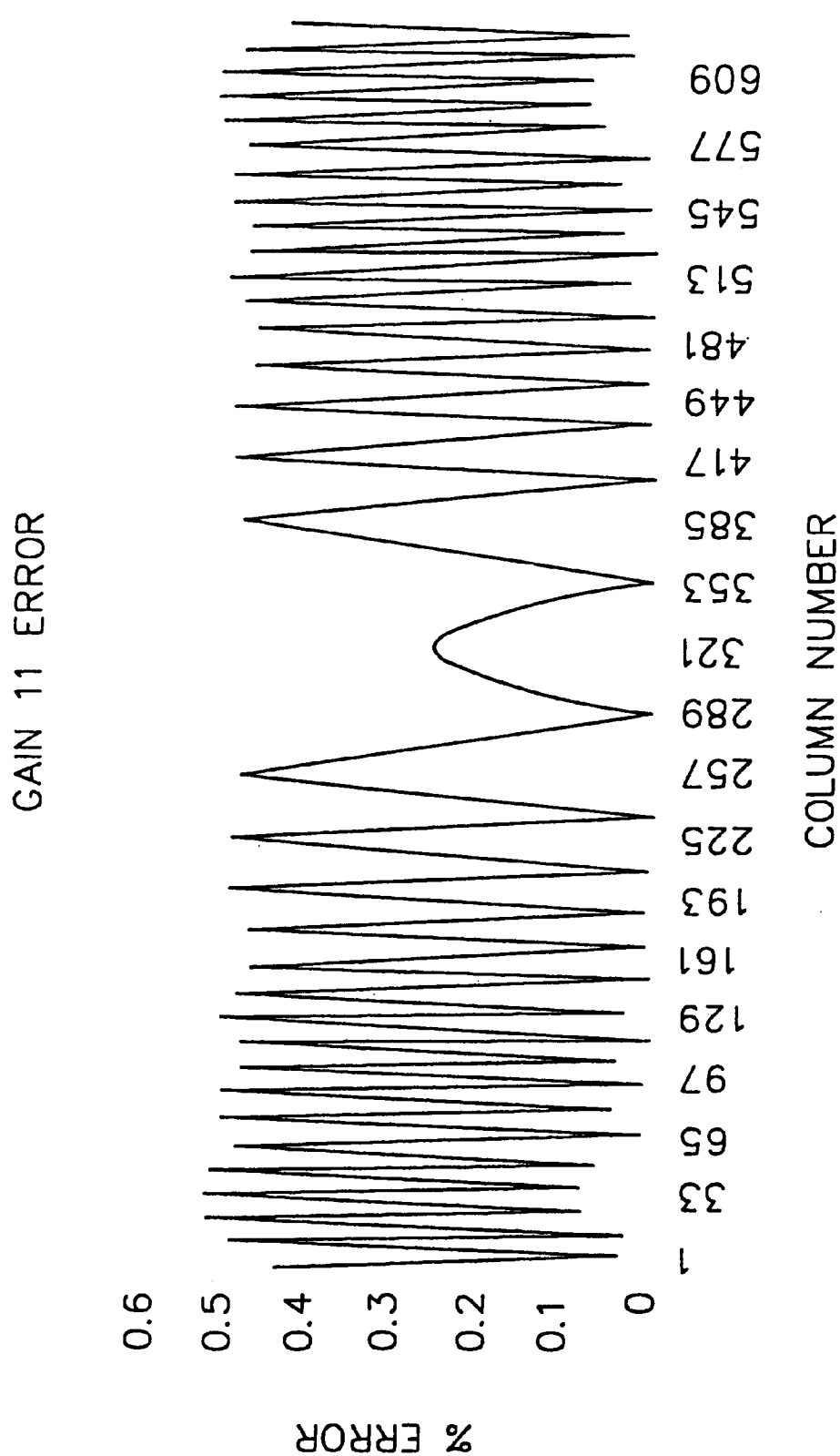
FIG. 16 is an illustration of percentage error due to quantization effects in the capacitors for the skimming and integration stages (by column).

FIG. 16 illustrates the quanitization errors that occur due to the quantization effects in the capacitors Cf and Cs for the skimming and integration stages. It can be seen here that an that an optical intensity error of 20 percent from the optical center axis CA to the sensor edge can be reduced to an error of less than 0.6%. In a similar way, the size of the skimming stage capacitor Cs can also be adjusted to provide skimming levels that have the same relative gain as the incident optical radiation taken relative to the axis CA. As the incident signal intensity decreases with distance from the optical center axis CA, the size of the auto zero CTIA feedback capacitor Cf decreases to normalize the gain. In addition, as the incident signal intensity decreases with distance from the optical center axis the amount of signal to be skimmed also decreases. As a result, the size of the skimming circuit capacitor Cs is also reduced. It is noted that it is desirable to make the capacitors Cf and Cs identical in their implementation such that there gain ratios do not see additional layout quantization affects.

Figure 17:
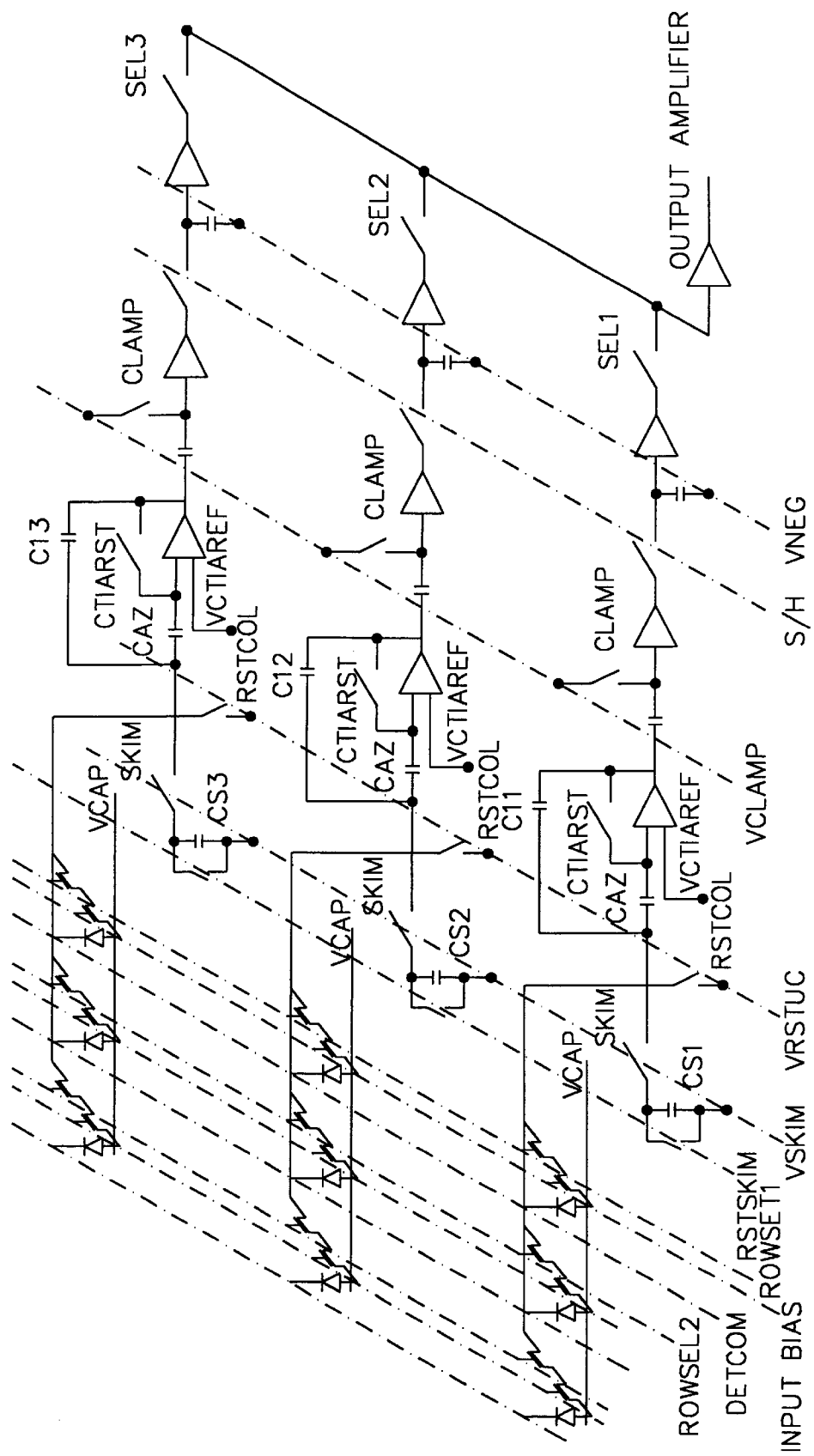
FIG. 17 is an illustration of 2-dimensional array with optical correction circuitry.

FIG. 17 illustrates the spatial implementation of the size adjusted capacitors Cf and Cs to achieve the optical correction signal processing function. Here the two-dimensional array of 3 by 3 unit cells is shown in three column signal processing chains multiplexed to a single output. For this illustration, if the optical center axis CA were aligned with the center column, the signal columns capacitors Cs1, Cf1 and Cs3 and Cf3 would have reduced values as compared with the center column capacitors Cs2 and Cf2.

Figure 18:
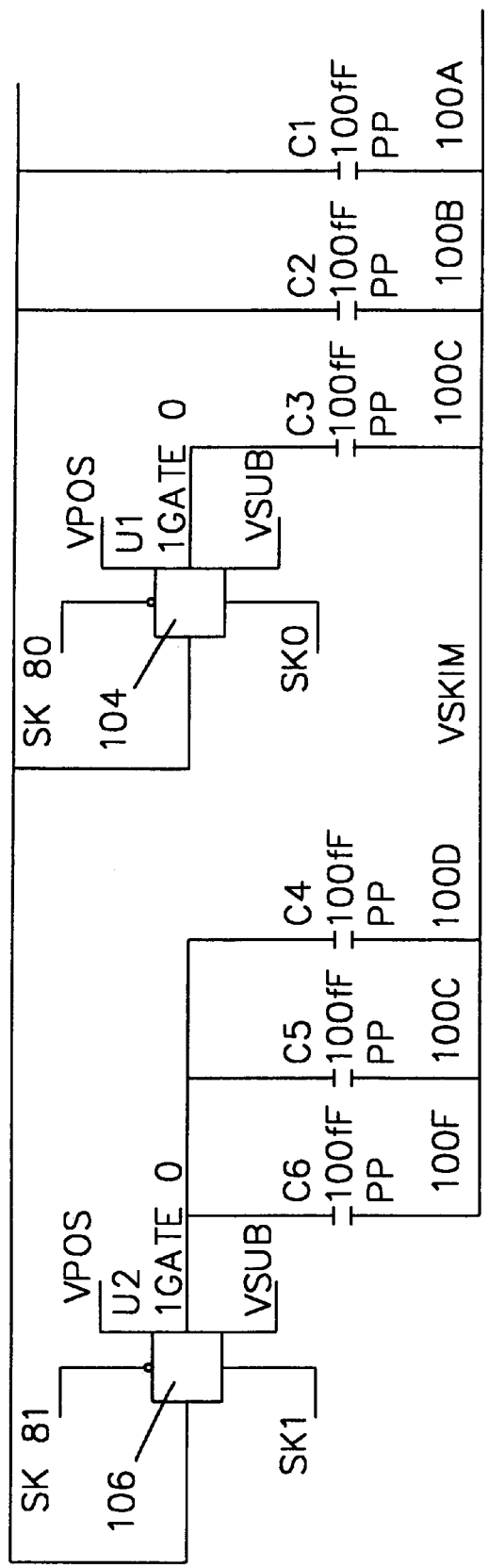
FIG. 18 is a partially fragmented schematic diagram of skimming circuit allowing optical correction.
Figure 19:
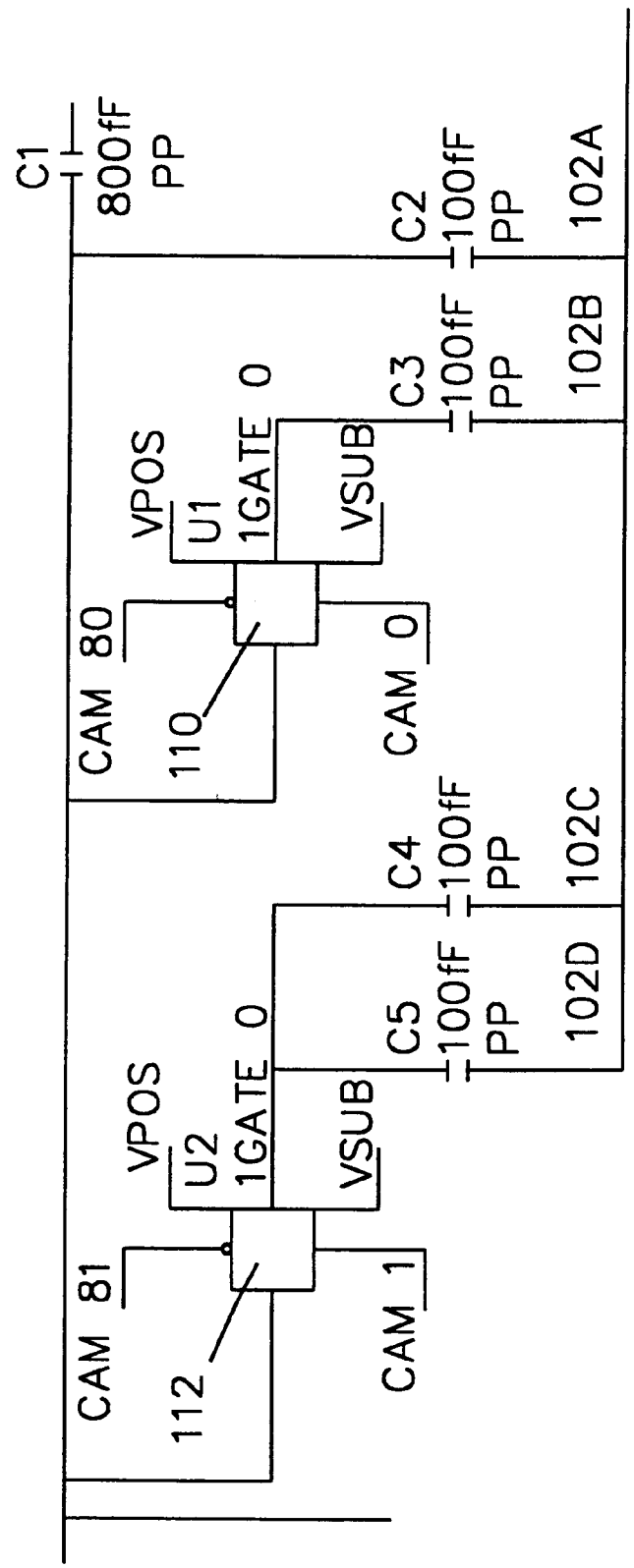
FIG. 19 is a partially fragmented schematic diagram of charge integration circuit allowing optical correction.

Referring now to FIG. 18, the detailed schematic for the skimming circuit 56 implemented on the 640×480 staring infrared sensor array is shown. It can be seen from this schematic that six capacitors 100*a*–100*f* serve the function of capacitor Cs referenced above in the previous illustrations and discussion. Each of the capacitors 100*a*–100*f* has a capacitance of 100*f* F. Two transmission gates 104 and 106 are used to enable capacitor 100*a*–*c* and 100*d*–*f*, respectively. These transmission gates enable the control of the skimming charge quantity for a fixed VSKIM potential operation. It should also be seen from this schematic, that all of the skimming circuit capacitors have been designed to be the same size. The schematic shown in FIG. 18 would be representative of the cell used in the column amplifier corresponding with the optical center axis CA. Cell implementations moving away from the optical center axis CA will have correspondingly decreased values for capacitors 100*a*–100*f* as illustrated in FIG. 15. FIG. 19 illustrates the schematic diagram of the auto zero CTIA feedback-circuit 60. As in the case of the skimming circuit the capacitors 102*a*–102*d* are shown at 100 *fF* each. These capacitors perform the function of the capacitor Cf referenced above in previous figures and discussions, and are shown at the correct size for the cell used in the column amplifier corresponding with the optical center axis CA. Cell implementations moving away from the center axis CA will have correspondingly decreased values for capacitors 102*a*–102*d* as illustrated by FIG. 15. Capacitor 102*b* and capacitors 102*c* and 102*d* are enabled by transmission gates 110 and 112, respectively. These transmission gates allow the gain or transimpedance characteristics for this amplifier to be controlled and to be set to one of four values.

It is also possible to correct for optical errors in two-dimensions for staring infrared sensor arrays. This is performed by realizing the capacitors 10*a* through 100*f* shown in FIG. 18, and capacitors 102*c*–102*d* as shown in FIG. 19, through the parallel combination of multiple capacitors. For each of the parallel capacitor instances, an enabling switch is incorporated to allow the capacitors to be connected in parallel with others for that group. These enabling switches allow the value for each capacitor group to be increased or decreased by adding capacitors to the parallel combination or removing capacitors from the parallel combination.

For optical systems where the cold shield center axis is centered over the detector, the $Cos^{4th}$ optical effect will provide the strongest optical signal in the center of the row address shift register with decreasing signals at the beginning and ending rows. The incorporation of logic that allows the value for each of the capacitors 100a through 100f as shown in FIG. 18, and 102a through 102d as shown in FIG. 19 to be changed as a function of row position allows row dimension optical correction. For example, at the first row each of the capacitors would be set to the smallest value. This value may be 80 percent of the value that would be desired for the center row location. As the row shift register is clocked, shift register taps set R-S latches that directly control the addition of capacitors to the parallel combination. Similarly, at specific row locations, these R-S latches are reset, removing capacitors from the parallel combination. This process provides that ability to adjust the transimpedance of the array as a function of row location and provides a means of performing row based optical gain correction.

Figure 20:
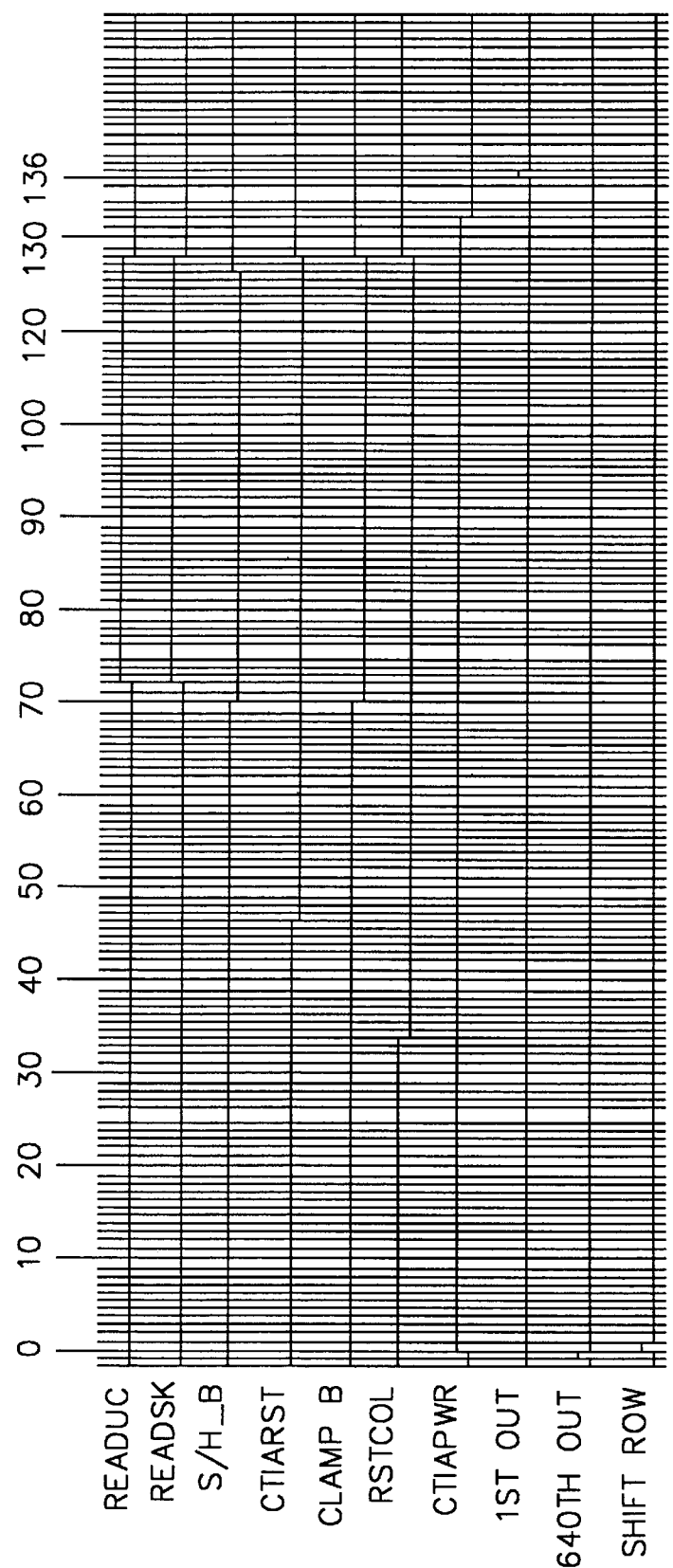
FIG. 20 is an illustration of a timing diagram for charge skimming and charge integration circuits allowing optical correction.

FIG. 20 illustrates a detailed timing diagram. The auto zero CTIA circuit reset function is performed by the clocks CTIARST and RSTCOL. As is apparent from FIG. 20 these clocks become active at clock state 128 performing the function of resetting the CTIA and clamping the auto zero input to VRSTUC. The clocks signal RSTCOL becomes inactive at clock state 34 and the clock CTIARST becomes inactive at clock state 46. It should be noted that the pattern shown in FIG. 20 is cyclical. It should also be noted from this timing diagram that the signal ReadUC is the decoded to generate RowEn_B as described above previously. The signal ReadSK is generated simultaneously for the function of skimming.

Figure 21:
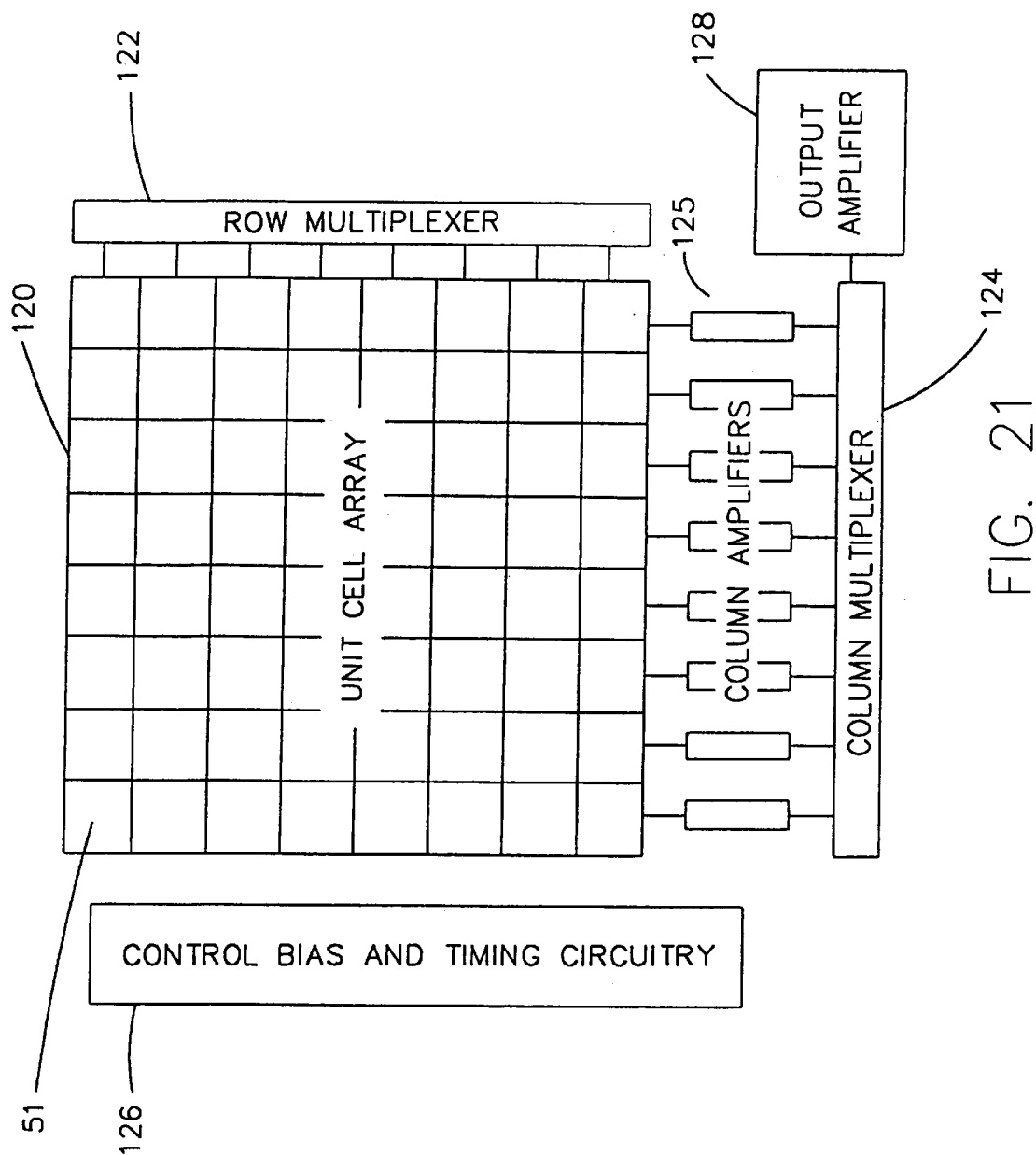
FIG. 21 is a block diagram of two dimension focal plane array show critical circuit component blocks.

FIG. 21 illustrates a block diagram of the top view of the readout integrated circuit containing the circuitry described in this application. Shown in the center of this diagram is an 8×8 array 120 of unit cells 51. A row multiplexer 122 is shown to provide the row addressing function and a column multiplexer 124 is shown to provide the column addressing function used in conjunction with column amplifiers 125. Control and timing generation circuitry 126 is also incorporated for generating biases, bias references and clocks. An output amplifier block 128 is also shown to provide output signal drive to external circuitry.

Figure 22:
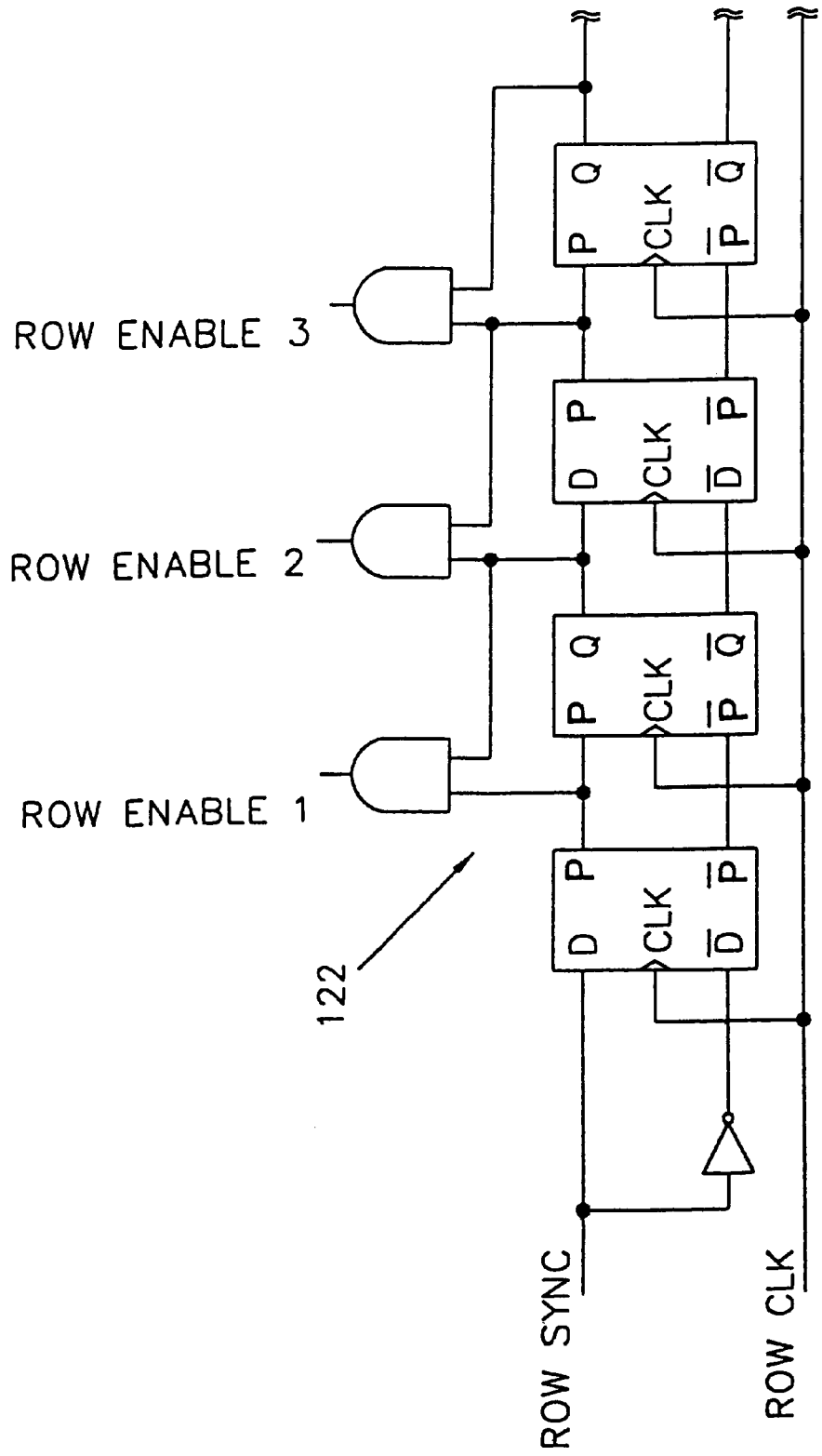
FIG. 22 is a block diagram of a row address multiplexer.
Figure 23:
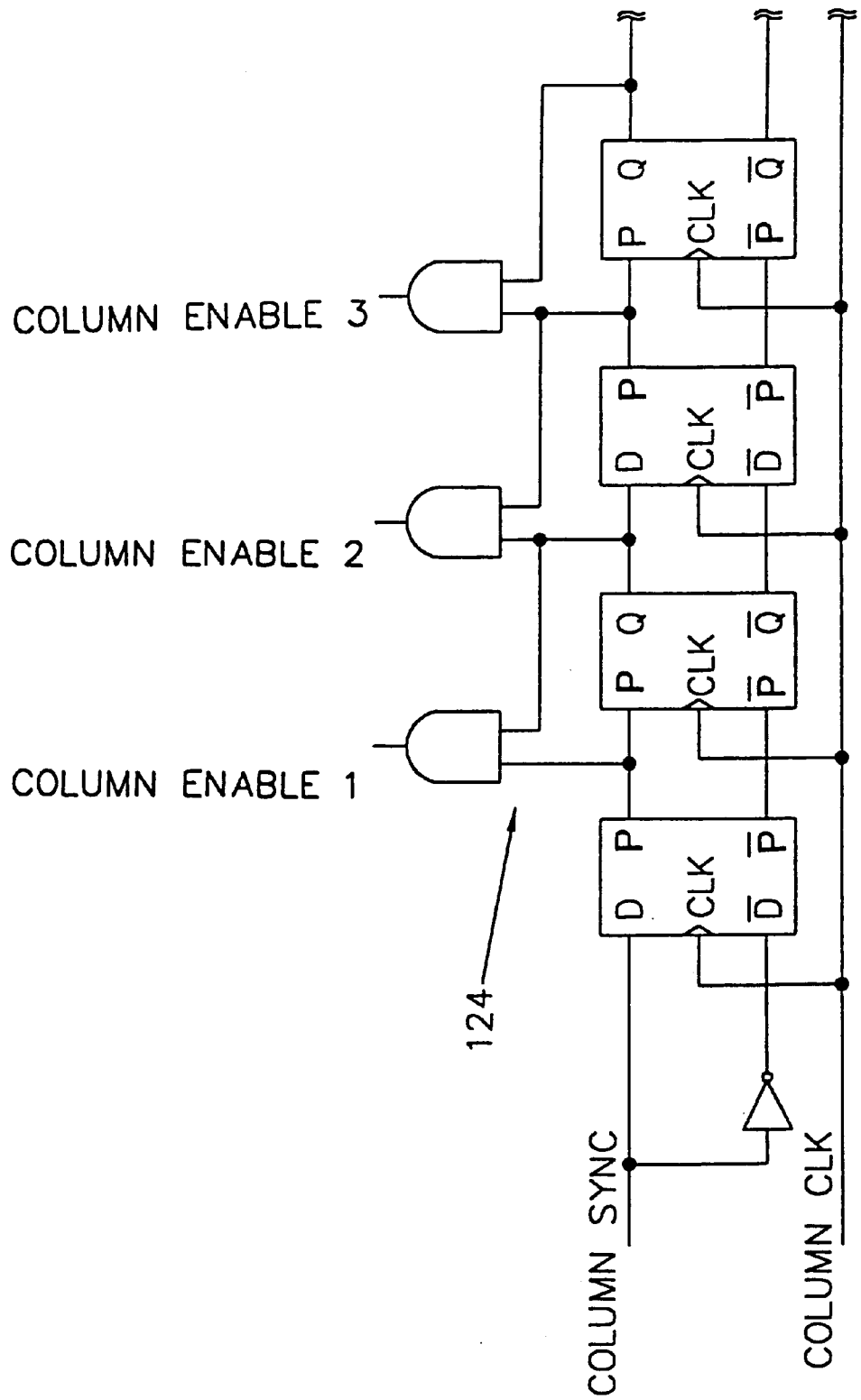
FIG. 23 is a block diagram of a column address multiplexer.

FIGS. 22 and 23 show block diagrams for simplified row address and column address multiplexers, respectively. For these circuits, a single logic state 1 is input into the register with the nominal input logic state at local 0. The row clock and/or column clock serve the function of clocking the logical state 1 down the register and subsequently enabling the row and column enable signals in sequence.

Figure 24:
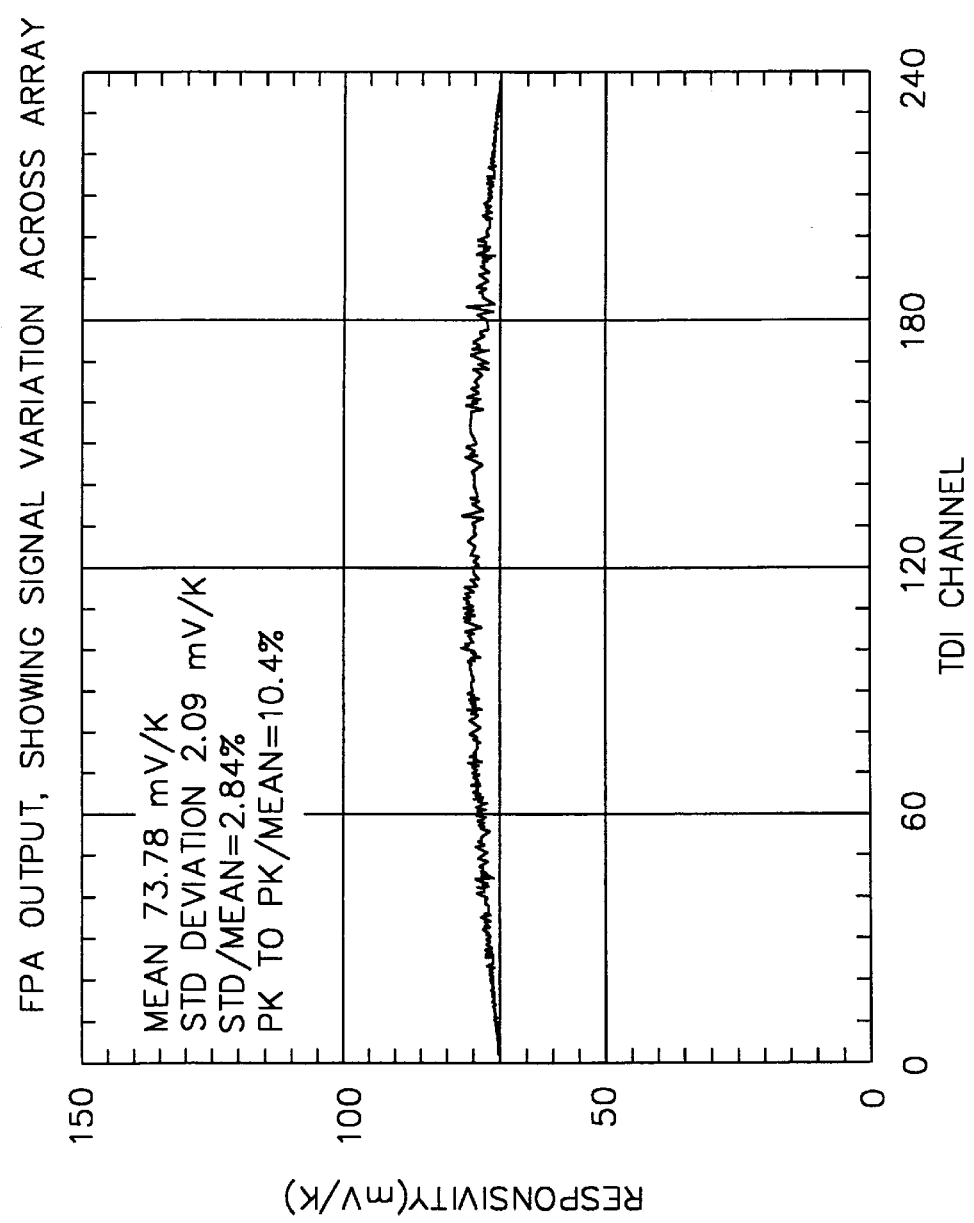
FIG. 24 is a graphical representation of data from a 240×4 linear infrared imaging sensor showing optical $Cos^{\wedge}4^{th}$ signal intensity error at edges of sensor.
Figure 25:
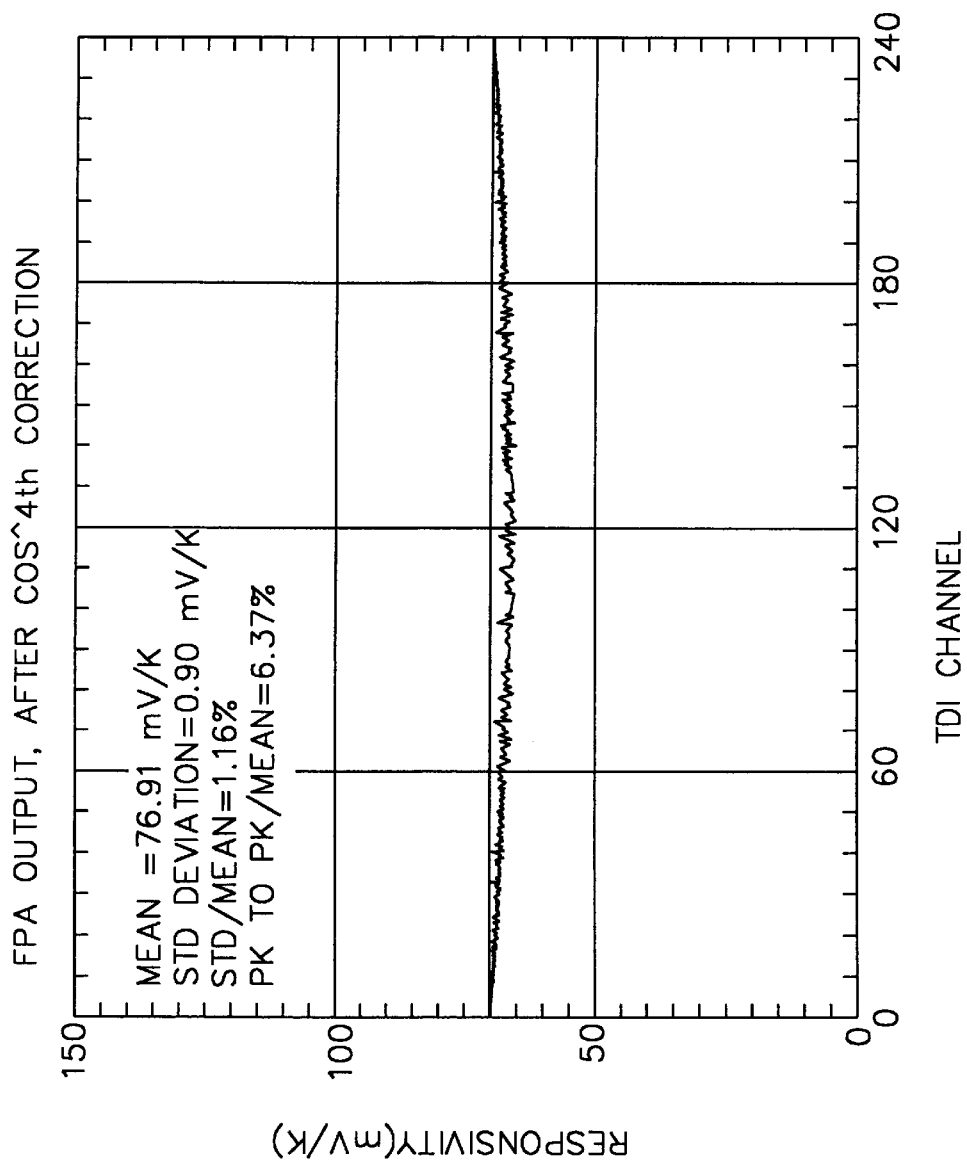
FIG. 25 is a graphical representation of data from 240×4 linear infrared imaging sensor processed with corrective gain for optical $Cos^{\wedge}4^{th}$ signal errors.

Referring now to FIGS. 24 and 25, graphs representative of data taken from SBRC-165 based 240×4 FPAs, integrated with f/1.77 cold shield having an air equivalent height of 0.52" are shown. More specifically, FIG. 24 shows the mean optical responsivity to be 73.78 mV/K with a maximum in the center of the array and decreasing responsivity to the array edges. It should be noted here that the calculation for responsivity treats the optical illumination as a constant for the array. Optical intensity errors as discussed previously, create a non-uniform optical signal intensity to the image sensor.

FIG. 25 shows the same data illustrated by FIG. 24, but incorporating the data for corrective gain using a Cos^4$^{th}$ algorithm. It is noted here that the Cos^4$^{th}$ corrective gain algorithm slightly over corrects the optical error observed. It is a possibility is that the optical test fixture for this test vignetted the array. Comparisons for the data pre and post optical correction show an improvement from a 1 sigma of 2.09 mV/K to 0.90 mV/K or better than a factor of two.

By the foregoing an improved apparatus and method is disclosed. However, numerous modifications and substitutions may be had without departing from the spirit of the invention.

What is claimed is:

1. A device for enhancing signal detection comprising:
   a sensory array of sensing elements extending in rows and in columns in first and second orthogonally disposed directions, respectively;
   a datum selected on said array for reference relative to said rows and columns;
   a plurality of circuit chains each associated with a given column of said sensing elements for processing a signal into recognizable form; and
   wherein each of said circuit chains taken relative to said datum has a means for producing a gain different from that of a circuit chain associated with a column of said sensing means located coincidentally with said datum.

2. A device as defined in claim 1 further characterized by said array being defined by a planar image surface made up of said plurality of said sensing elements and said datum is a point on said array referenced to the optical central axis.

3. A device as defined in claim 1 characterized by each of said circuits associated with a column of said sensing elements having a capacitive transimpedance amplifier portion.

4. A device as defined in claim 3 wherein the capacitive transimpedance amplifier portion of each of said circuit chains associated with a given column of said sensing elements has a capacitance which differs from the circuit chain associated with the column of sensing elements located coincidentally with said datum.

5. A device as defined in claim 1 characterized by each of said circuits associated with a column of said sensing elements having a skimmer circuit portion.

6. A device as defined in claim 5 further wherein the skimmer circuit portion of said circuit chain associated with a given column of sensing elements other than that located coincidentally with said datum has a capacitance which differs from the capacitance of the skimmer circuit portion of a circuit chain associated with said circuit chain associated with said sensing elements coincident with said datum.

7. A device as defined in claim 1 further characterized by each of said circuits associated with a column of said sensing elements having a circuit portion defined by a capacitive transimpedance amplifier and skimmer circuit portion.

8. A device as defined in claim 7 wherein the capacitive transimpedance amplifier portion and skimmer circuit portion of each of said circuit chains associated with a given column of said sensing elements not coincident with said datum has a capacitance which differs from the corresponding capacitive transimpedance amplifier portion and skimmer circuit portion of the circuit chain associated with a column located coincidentally with said datum.

9. A device as defined in claim 3 further characterized in that each of said circuit chains associated with a column of said sensing elements has for each sensing element in said column a capacitance associated with the capacitive transimpedance amplifier portion which is dependent on the row of the sensing element.

10. A device as defined in claim 5 further characterized in that each of said circuit chains associated with a column of said sensing elements has for each sensing element in said column a capacitance associated with the skimmer circuit portion which is dependent on the row of the sensing element.

11. A device as defined in claim 7 further characterized in that each of said circuit chains associated with a column of said sensing elements has for each sensing element in said column a capacitance associated with the skimmer circuit portion which is dependent on the row of the sensing element and a capacitance associated with the capacitive transimpedance amplifier portion which is dependent on the row of the sensing element.

12. A device as defined in claim 1 further characterized by each column of said sensing elements extending in said first given direction and each of said circuit chains associated with said columns of sensing elements being connected to one another to effect communication therebetween in said second orthogonally disposed direction.

13. A device as defined in claim 12 further characterized by said circuit chains being multiplexed to an output amplifier to effect function in said second given orthogonally disposed direction.

14. A device as defined in claim 12 further characterized by said array of said sensing elements being row addressed and column addressed by a plurality of multiplexers.

15. A method of enhancing a signal comprising the steps of:

provided a sensory array comprised of a plurality of sensory elements arranged in rows and columns;

selecting a datum on said array and referencing said rows and columns of said sensing elements relative to said datum;

determining a prescribed gain for signals generated from a given column of said sensing element taken relative to the strength of a signal from sensory elements at said datum;

and processing signals generated by a given row of said sensing elements in a dedicated circuit chain having an preassigned gain value capable of compensating for signal strength which is less than that of a signal detected at the datum.

16. A method as defined in claim 15 further characterized by interconnecting circuit chains in each column of sensing elements with one another.

17. A method as defined in claim 15 further characterized by configuring each circuit chain associated with a given column of sensing element to an established prescribed gain by altering the capacitance of that circuit chain relative to the capacitance of the circuit chain associated with the column of sensing elements located coincidentally at said datum.

18. A method as defined in claim 17 further characterized by sampling the signals produced in a given column of sensing element to establish a prescribed gain.

* * * * *

UNITED STATES PATENT AND TRADEMARK OFFICE
CERTIFICATE OF CORRECTION

PATENT NO.   : 6,288,387 B1
DATED        : September 11, 2001
INVENTOR(S)  : Stephen H. Black and James T. Woolaway II It is certified that error appears in the above-identified patent and that said Letters Patent is hereby corrected as shown below:

<u>Title page,</u>
Item [73], should read as follows:
Assignee: Raytheon Company, Lexington MA (US) and Indigo Systems Corporation, Goleta CA (US)

Signed and Sealed this

Fifteenth Day of January, 2002

Attest:

JAMES E. ROGAN
Director of the United States Patent and Trademark Office

Attesting Officer